United States Patent [19]

Kamoshita et al.

[11] 4,314,710
[45] Feb. 9, 1982

[54] RACK AND PINION STEERING GEAR HOUSING MOUNTING STRUCTURE

[75] Inventors: Akio Kamoshita; Akihiko Matsumoto; Takashi Kurihara, all of Yokohama, Japan

[73] Assignee: Nissan Motor Co., Ltd., Yokohama, Japan

[21] Appl. No.: 71,123

[22] Filed: Aug. 30, 1979

[30] Foreign Application Priority Data

Sep. 5, 1978 [JP] Japan .......................... 53-121125[U]

[51] Int. Cl.³ ............................................ B62D 1/00
[52] U.S. Cl. ......................................... 280/96; 74/29
[58] Field of Search ...................... 280/96; 74/29, 30; 403/13, 14, 359; 285/373, 243

[56] References Cited

U.S. PATENT DOCUMENTS 3,215,459  11/1965  Baldwin .............................. 403/13
3,869,139  3/1975   Gage .................................. 280/96
4,131,375  12/1978  Fisher ................................ 403/13

FOREIGN PATENT DOCUMENTS 7513978  5/1975  France .................................. 280/96

Primary Examiner—Joseph F. Peters, Jr.
Assistant Examiner—John A. Carroll
Attorney, Agent, or Firm—Thompson, Birch, Gauthier & Samuels

[57] ABSTRACT

A rack and pinion steering gear housing mounting structure for an automotive vehicle comprises a housing mounting portion which is cylindrical and rotatably supported on a support bracket, and whose cylindrical portion includes a positioning protrusion, flat portion or recess which is adapted to engage a hole, flat portion or protrusion formed in a clamp plate for clamping the cylindrical housing mounting portion to the support bracket, thereby accommodating changes in the mounted angle of the steering gear housing.

7 Claims, 6 Drawing Figures

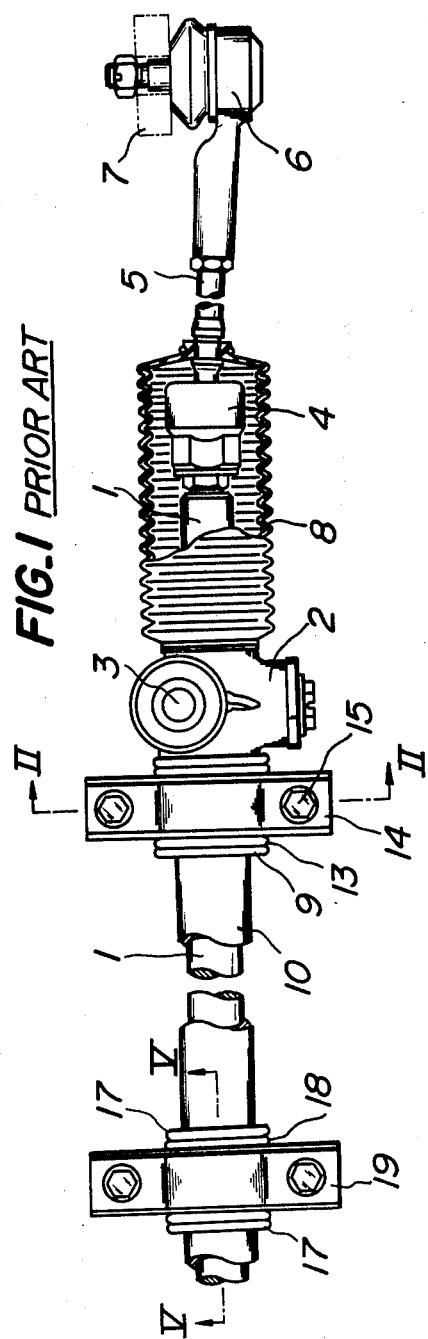
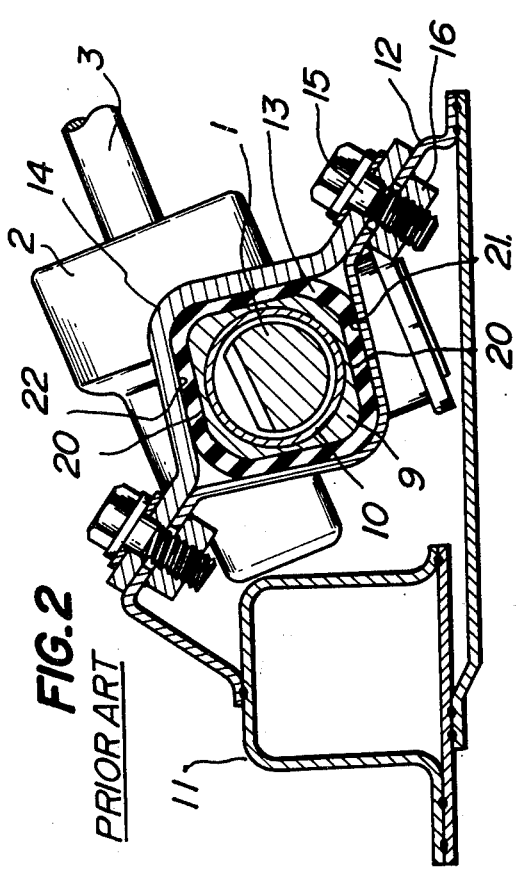
FIG.1 PRIOR ART
FIG.2 PRIOR ART

RACK AND PINION STEERING GEAR HOUSING MOUNTING STRUCTURE

BACKGROUND OF THE INVENTION

1. Field of the Invention

The present invention relates to a rack and pinion steering gear housing mounting structure for an automotive vehicle.

2. Description of the Prior Art

In general, a rack and pinion steering gear as shown in FIG. 1 comprises a rack 1 passing through a steering gear housing 2 which supports therein a steering pinion shaft 3 perpendicular to the rack 1. The steering pinion shaft 3 is provided thereon with a pinion (not shown) which is adapted to be in mesh with the rack 1 within the housing 2. To one end of the steering pinion shaft 3 is connected through a universal coupling a steering shaft (not shown) which is provided thereon with a steering wheel. By rotatively operating the steering wheel the rack 1 is caused to move in its axial directions. To both ends (only one end shown in the drawing) of the rack 1 are connected side rods 5 through joints 4, to which are further connected steering knuckles 7 through joints 6 for steering wheels of a vehicle. A dust cover 8 covers the joint 4 and the part of the rack 1.

The rack 1 slidably extends in a rack tube 10 having one end press fitted in a housing mounting portion 9 of the steering gear housing 2. The housing mounting portion 9 is supported through an insulator 13 on a mounting side support bracket 12 fixed to a vehicle frame cross member 11 (FIG. 2) and restrained against the support bracket 12 by a clamp plate 14 firmly fixed thereto by means of bolts 15 and nuts 16. On the rack tube 10 are mounted mounting plates 17 at other mounting portions spaced apart by a suitable distance, between which is interposed a mounting rubber 18. The mounting plates 17 are then fixed onto a support bracket fixed to the vehicle frame cross member 11 by a clamp plate 19 in the same manner as above described.

In the above rack and pinion steering gear, the steering gear housing has been positioned and fixed in accordance with a mounted angle of the steering pinion shaft determined by its positional relation to the steering shaft. Therefore, the housing mounting portion 9 is formed in square or lozenge in outer crosssectional configuration to provide flat surfaces 20, and the support bracket 12 and clamp plate 14 are formed with flat surfaces 21 and 22 corresponding to those 20 of the housing mounting portion 9 as shown in FIG. 2, thereby positioning and fixing the steering gear housing with the aid of these flat surfaces.

With such a hitherto used housing mounting structure, however, every time the mounting angle of the steering gears is changed, it would be necessary to modify the configuration of the housing of the configuration or structure of the support bracket on the vehicle frame side, which is very troublesome.

SUMMARY OF THE INVENTION

It is a principal object of this invention to provide an improved rack and pinion steering gear housing mounting structure capable of easily changing a mounted angle of a rack and pinion steering gear.

To accomplish this object the rack and pinion steering gear housing mounting structure for an automotive vehicle includes a steering gear housing having a housing mounting portion, a support bracket on a vehicle frame side for supporting said housing mounting portion and a clamp plate for clamping said housing mounting portion to said support bracket. According to the invention the housing mounting portion is made cylindrical so as to be rotatably supported on the support bracket, with positioning means being provided on a part of the cylindrical surface of said housing mounting portion. An engaging means provided on said clamp plate is engageable with said positioning means on said housing mounting portion, thereby positioning the steering gear housing.

The invention will be more fully understood by referring to the following detailed specification and claims taken in connection with the appended drawings.

BRIEF DESCRIPTION OF THE DRAWINGS

FIG. 1 is a plan view, partly broken away, of one part of a rack and pinion steering gear of the prior art as described above;

FIG. 2 is an enlarged detailed sectional view taken along line II—II in FIG. 1 for illustrating the prior art construction of the housing mounting portion as described above;

DETAILED DESCRIPTION OF THE PREFERRED EMBODIMENT

Figure 3:
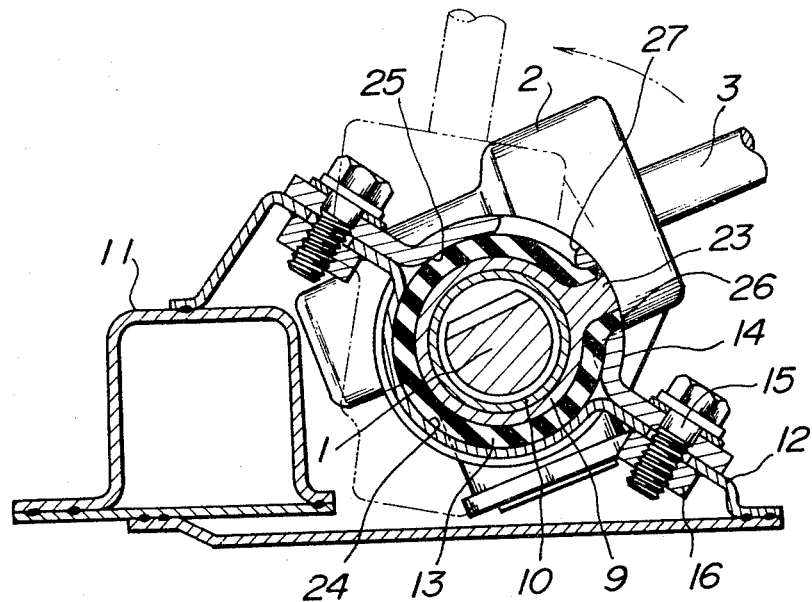
FIG. 3 is an enlarged detailed sectional view of the rack and pinion steering gear housing mounting structure according to the invention.

Referring to FIG. 3 which illustrates one embodiment of the present invention, a housing mounting portion 9 is formed in a cylindrical configuration and is provided at its one portion with a positioning protrusion 23. A support surface 24 of a support bracket 12 for the cylindrical mounting portion 9 is semicircular in section concentric thereto. A clamping portion 25 of a clamp plate 14 for fastening the cylindrical mounting portion 9 to the support bracket 12 is also semicircular in section similar to the support surface 24 of the support bracket 12 and is formed with an engaging hole 26 for passing the protrusion 23 of the mounting portion 9 therethrough. Another hole may be provided in the clamping portion 25 as a spare hole for changing the mounting angle of the steering gear.

With the above arrangement, when it is required to change the mounting angle of the steering gear, the clamp plate 14 is removed and the housing mounting portion 9 is rotated together with an insulator 13 secured thereabout on the semicircular support surface 24 of the support bracket 12 to a desired position as shown in phantom lines in FIG. 3 to bring the steering gear housing substantially in the desired mounted angle, and thereafter other clamp plate having an engaging hole suitable for the desired mounted angle of the steering gear or the clamp plate 14 having the engaging hole 27 suitable for the desired mounted angle is secured to the support bracket 12, so that the engaging hole 27 engages the protrusion 23 of the housing mounting portion 9, which has been rotated to a substantially correct position, to exactly position the housing mounting portion 9 in place. In this manner, the change of the mounting angle and the exact positioning of the housing mounting portion 9 are effected with ease only by the use of the clamp plate having an engaging hole suitable for a desired mounting angle of the steering gear.

Figure 4:
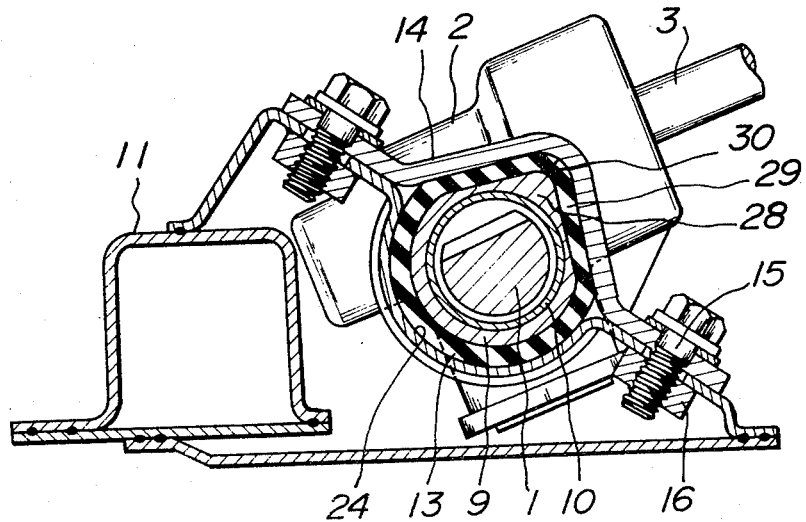
FIG. 4 is a sectional view similar to FIG. 3 showing another embodiment of the invention.

FIG. 4 illustrates another embodiment of the invention, wherein a housing mounting portion 9 is made in a cylindrical configuration similar to that shown in FIG. 3 and is provided on its one part with a positioning protrusion 28 in the form of a triangle in crosssection. A clamp plate 14 is formed with an engaging recess 30 which is supplemental or commensurate to the L-shaped protrusion 28, more exactly, to a portion 29 of an insulator 13 covering the protrusion 28. According to the embodiment, the change of the mounting angle and the exact positioning of the housing mounting portion are also effected with ease in the same manner as in FIG. 3 only by preparing clamp plates formed with engaging recesses in different positions.

In the above embodiments, the protrusions are provided for positioning. It should be understood by those skilled in the art that instead of the protrusions flat portions or recesses may be provided and flat portions and raised portions mating therewith may be provided in the clamp plate.

Figure 5:
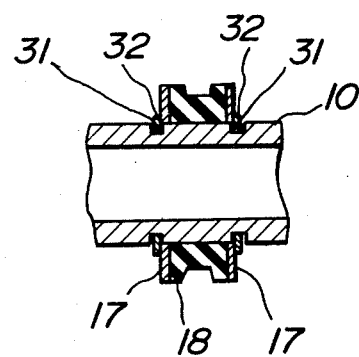
FIG. 5 is a sectional view taken along line V—V in FIG. 1 illustrating a mounting of a rack tube and mounting plates.
Figure 6:
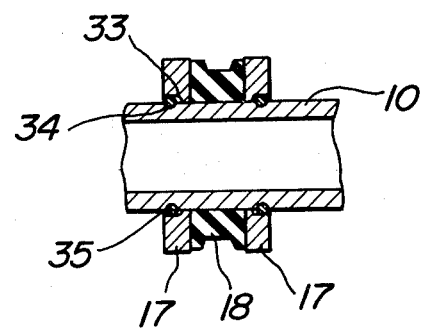
FIG. 6 is a sectional view illustrating a modification of the mounting shown in FIG. 5.

FIGS. 5 and 6 illustrate improvements of mounting plates 17 on the rack tube 10 as other mounting of the housing mounting portion.

As above described, a pair of mounting plates 17 are spaced apart and fixed onto the rack tube 10 for fixing the rack tube 10 to the vehicle frame cross member 11, thereby remarkably simplifying the mounting construction which is inexpensive to manufacture in comparison with the case of using casting material. In the prior art, the mounting plates 17 are usually welded to the rack tube 10, so that thermal strains due to welding tend to occur in the rack tube and therefore straightening of the tube is required after welding. In case of a power steering which requires high accuracy in each part, remachining of parts is needed with an accompanying increase in the manufacturing steps and cost.

Referring to FIG. 5, in view of the disadvantage resulting from the welding the mounting plates 17 to the rack tube 10, the rack tube 10 is formed with a pair of circumferential grooves 31 spaced apart in the axial direction of the rack tube 10, within which are fitted retainer rings 31 such as snap rings or the like by which the mounting plates 17 are fixed in place.

Referring to FIG. 6, the rack tube 10 and mounting plates 17 are formed with circular grooves 33 and 34, within which are fitted circular retainer rings 35 to held the mounting plates 17 in place. The retainer rings 35 having a circular crosssection as shown in FIG. 6 are particularly advantageous in strength. In any embodiments in FIGS. 5 and 6, the mounting plates 17 are fixed to the rack tube 10 without using any welding operation, so that the straightening and remachining after welding are not needed and particularly in power steering mechanism which requires high accuracy parts working steps are remarkably reduced to lower the cost of manufacture.

As can be seen from the above description, according to the invention the housing mounting portion of the rack and pinion steering gear is made cylindrical and is provided on its part with a positioning protrusion, flat portion or recess, and the positioning of the housing mounting portion is effected by the use of the clamp plate provided with an engaging hole, flat portion or protrusion adapted to engage the protrusion, flat portion or recess of the housing mounting portion, so that the change of mounting angle and positioning is effected with ease without modifying the housing or support bracket and the accuracy in positioning cas easily be improved to increase the freedom in design remarkably.

While the invention has been particularly shown and described with reference to preferred embodiments thereof, it will be understood by those skilled in the art that the foregoing and other changes in form and details can be made therein without departing from the spirit and scope of the invention.

What is claimed is:

1. In a rack and pinion steering gear housing mounting structure for an automotive vehicle including a steering gear housing having a housing mounting portion, a support bracket on a vehicle frame for supporting said housing mounting portion and a clamp plate for clamping said housing mounting portion to said support bracket, the improvement comprising said housing mounting portion having a cylindrical wall rotatably seated in a cylindrical cavity on the support bracket, positioning means on said housing mounting portion arranged oppositely to said cylindrical cavity, and engaging means provided on said clamp plate for cooperating with said positioning means to rotatably fix said housing mounting portion at a selected angle relative to said support bracket.

2. A structure as set forth in claim 1, wherein said positioning means comprises a protrusion formed on said cylindrical mounting portion and said engaging means comprises an engaging hole formed in said clamp plate.

3. A structure as set forth in claim 2, wherein a separate engaging hole is formed in said clamp plate so as to engage said protrusion formed on the cylindrical mounting portion when the mounting angle of the housing has been changed.

4. A structure as set forth in claim 1, wherein said positioning means comprises a protrusion formed on said cylindrical mounting portion in the form of a triangle in crosssection, and said engaging means comprises an engaging recess formed in said clamp plate commensurate to said protrusion.

5. A structure as set forth in claim 1, wherein said positioning means comprises a flat portion of the mounting portion and said engaging means comprises a flat portion mating with said flat portion of the mounting portion.

6. A structure as set forth in any one of claims 1-5, wherein another mounting portion of the housing is formed with a pair of circumferential grooves spaced apart, within which are fitted retainer rings between which are arranged mounting plates and a molding rubber therebetween.

7. A structure as set forth in claim 6, wherein said circular grooves are formed in both said another mounting portion and said mounting plates and said retainer rings have a circular crosssection.

* * * * *